(12) United States Patent
Lee

(10) Patent No.: US 6,313,781 B1
(45) Date of Patent: Nov. 6, 2001

(54) SIMULTANEOUS INTRAPULSE ANALYSIS, DIRECTION FINDING AND LPI SIGNAL DETECTION

(75) Inventor: Jim P. Y. Lee, Nepean (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 0 days.

(21) Appl. No.: 09/597,251

(22) Filed: Jun. 19, 2000

(30) Foreign Application Priority Data

Jul. 27, 1999 (CA) ................................................ 2279160

(51) Int. Cl.[7] ............................... G01S 7/40; G01S 7/285
(52) U.S. Cl. ........................... 342/13; 342/147; 342/192; 342/196; 342/417; 342/444
(58) Field of Search .................................. 342/13, 14, 15, 342/16, 17, 18, 19, 20, 21, 147, 162, 173, 192, 194, 195, 196, 417, 444, 445; 455/227

(56) References Cited

U.S. PATENT DOCUMENTS

| | | | |
|---|---|---|---|
| 4,387,373 | * | 6/1983 | Longueimar, Jr. ...................... 342/25 |
| 4,649,389 | * | 3/1987 | Taylor, Jr. et al. .................. 342/123 |
| 4,905,010 | * | 2/1990 | Baechtiger et al. .................. 342/151 |
| 4,928,105 | * | 5/1990 | Langner ............................... 342/192 |
| 5,057,845 | * | 10/1991 | Gellekink ............................ 342/137 |
| 5,128,679 | * | 7/1992 | Moffat ................................... 342/13 |
| 5,204,683 | * | 4/1993 | Auvray ................................. 342/150 |
| 5,230,097 | * | 7/1993 | Currie et al. ....................... 455/226.1 |
| 5,363,103 | * | 11/1994 | Inkol .................................... 342/13 |
| 5,579,341 | | 11/1996 | Smith et al. .......................... 375/267 |
| 5,657,026 | * | 8/1997 | Culpepper et al. .................. 342/374 |
| 5,818,883 | | 10/1998 | Smith et al. .......................... 375/347 |
| 6,043,771 | * | 3/2000 | Clark et al. ............................. 342/13 |
| 6,049,573 | * | 4/2000 | Song .................................... 375/316 |
| 6,177,904 | * | 1/2001 | Coenen et al. ......................... 342/62 |

\* cited by examiner

*Primary Examiner*—John B. Sotomayor
(74) *Attorney, Agent, or Firm*—Larson & Taylor PLC

(57) ABSTRACT

The present invention relates to multi-function, multi-channel digital receiver architecture for performing three distinct receiver functions including simultaneous intrapulse analysis, direction finding and LPI signal detection; for determining parameters of incoming signals, comprising a plurality of receiver channels, each channel including a respective antenna for receiving the signal; a down-converter for converting the signal to an intermediate frequency (IF) signal; and an analog-to-digital converter operatively coupled to receive the IF signal and to provide a digital signal at a sampling rate, the digital signal being indicative of the amplitude and phase of the received signal in the channel, and a digital processor operatively coupled to receiving the digital signals from each of the plurality of channels for determining the amplitude and phase intrapulse profiles; by combining the amplitude and phase intrapulse profiles from all of the plurality of channels to provide both intrapulse and conventional parameters of a better quality on a pulse by pulse basis; and utilizing both the AOA and intrapulse information for parameter validation under multipath conditions.

16 Claims, 2 Drawing Sheets

SIMULTANEOUS INTRAPULSE ANALYSIS, DIRECTION FINDING AND LPI SIGNAL DETECTION

This invention relates to a reconnaissance system, and more particularly to a digital multifunction radar receiver architecture used in a reconnaissance system which is capable of simultaneous intrapulse analysis, direction finding and LPI signal detection.

BACKGROUND OF THE INVENTION

Various reconnaissance systems are used to intercept radar signals and decipher some of their critical characteristics and angles of arrival. A microwave intercept receiver may be used for just this purpose. In particular reconnaissance applications in areas such as Electronic Warfare (EW), the receiver is designed to fulfill roles such as radar warning, electronic support measures (ESM), and Electronic Intelligence (ELINT). In most conventional approaches, the intercept receiver is designed to perform two functions. The first function is to measure the signal characteristics of the intercepted signal, and the second is to determine its angle of arrival (AOA) for the purpose of direction finding (DF) and location of the radar source.

With the proliferation of radar systems and the increasing number of radars employing complex waveform modulation, it is difficult to differentiate and sort the intercepted radar signals using just the coarse conventional parameters. Typically these coarse parameters include AOA, carrier frequency, pulse width (PW), pulse repetition interval (PRI), and scan pattern. Since many radars have similar conventional parameters, ambiguity may occur in both the sorting and identification processes.

One type of receiver that may be used to precisely measure the conventional parameters as well as the intrapulse modulation for both sorting and identification purposes is the intrapulse receiver.

However, the use of Low Probability of Intercept (LPI) radars with low peak power has introduced a further requirement for modem intercept receivers, requiring them to have a much higher sensitivity in order to detect these LPI radar signals. Until recently, almost all radars were designed to transmit short duration pulses with a high peak power. This type of signal is easy to detect using relatively simple, traditional EW intercept receivers making the attacker (radar source) vulnerable to either antiradiation missiles or Electronic Counter Measures (ECM). However, by using LPI techniques it is possible to design a LPI radar that is effective against traditional EW intercept receivers. One of the most important LPI techniques is the use of phase or frequency waveform coding to provide transmitting duty cycles approaching one. This technique can result in drastic reductions in peak transmitted power while maintaining the required average power.

Therefore, with an increasing number of radars employing complex waveform modulation in addition to using low-peak power LPI signals, it is required that a modern intercept receiver perform the following three basic functions: a) measure and characterize conventional pulsed radar signals; b) detect and characterize LPI signals; and c) determine the AOA for both conventional pulsed signals and LPI signals. Furthermore, these three functions should be performed on the intercepted signals in a multiple signal environment and on a pulse-by-pulse basis.

A current architecture that accomplishes both signal measurement and accurate AOA determination on conventional pulsed signals is an interferometer. In an interferometer, a number of antenna elements are distributed in a two-dimensional plane and phase comparison between different antenna elements is used to determine the AOA. Microwave phase detectors are typically used for phase comparison. Recently these phase detectors have been replaced by digital measurement techniques. The signal characteristics of the intercepted signals are measured either from the output of one of the interferometer antennas or from a separate antenna. Signal characterization is performed using an intrapulse receiver which is traditionally implemented by analog devices. In this case, a frequency discriminator is used for frequency measurement while a Detector Log Video Amplifier (DLVA) is used for amplitude measurement.

Detection of LPI signals is currently accomplished using a channelized receiver instead of an intrapulse receiver. A channelized receiver is typically implemented using either a band of microwave filters with a detector at the output of each filter. Other receivers may be used, such as a time-integrating acousto-optic spectrum analyzer and compressive receiver. The use of a channelizer will reduce the noise bandwidth in each channel and thus increase the receiver sensitivity for LPI signal detection. Other architectures such as correlators are also suitable for LPI signal detection and AOA determination. These correlators are implemented using analog, optical, or digital technology. However, the AOA determination process is quite different from the interferometer approach and very limited intrapulse information can be extracted.

Thus, some of the limitations of current receiver systems are that use of different receiver technologies results in a more complex system architecture and implementation. Since each receiver usually performs only one specific function, elaborate control and correlation of different receiver outputs are required for arriving at a complete picture of a high-density signal environment. If the correlation is not done precisely, ambiguity or even discrepancy in the signal recognition process may occur. Furthermore, the original signal content from each antenna is not preserved in the detection process and thus, in general, cannot be combined with the same signal appearing from other channels for enhancing the overall signal-to-noise ratio (SNR).

It is an object of the present invention to obviate or mitigate some of the above disadvantages.

SUMMARY OF THE INVENTION

In general terms, the present invention seeks to provide a solution to the problem of measuring signal characteristics of conventional pulsed radar signals, detecting and characterizing LPI signals, and determining the AOA of both conventional and LPI radar signals.

In accordance with this invention there is provided a multi-channel digital receiver architecture for determining parameters of an incoming signal, the parameters including simultaneous intrapulse analysis, direction finding and LPI signal detection, comprising: a plurality of receiver channels, each channel including a respective antenna for receiving the incoming signal; a down converter for converting the signal to an intermediate frequency (IF) signal; and an analog-to-digital converter operatively coupled to receive the IF signal and to provide a digital signal at a sampling rate, the digital signal being indicative of the phase and amplitude of the received signal in the channel; a digital processor operatively coupled to receiving the digital signals from each of the plurality of channels and for determining the parameters by utilizing the phase and amplitude on a pulse-by-pulse basis.

In accordance with a further aspect of this invention there is provided a multi-function, multi-channel digital receiver architecture for performing the three distinct receiver functions including simultaneous intrapulse analysis, direction finding and LPI signal detection, on the measurement of parameters including intrapulse, precision conventional and angle-of-arrival (AOA) parameters of incoming signals, comprising: a plurality of receiver channels, each channel including a respective antenna for receiving the signal; a down-converter for converting the signal to an intermediate frequency (IF) signal; and an analog-to-digital converter operatively coupled to receive the IF signal and to provide a digital signal at a sampling rate, the digital signal being indicative of the amplitude and phase of the received signal in the channel, and a digital processor operatively coupled to receiving the digital signals for each of the plurality of channels and for determining the parameters by utilizing the amplitude and phase on a pulse-by-pulse basis; by combining the amplitude and phase intrapulse profiles from all the plurality of channels to provide parameters of a better quality and utilizing both the AOA and intrapulse information for parameter validation multipath conditions.

BRIEF DESCRIPTION OF THE DRAWINGS

An embodiment of the invention will now be described by way of example only, with reference to the accompanying drawings in which.

DETAILED DESCRIPTION OF THE PREFERRED EMBODIMENT

Figure 1:
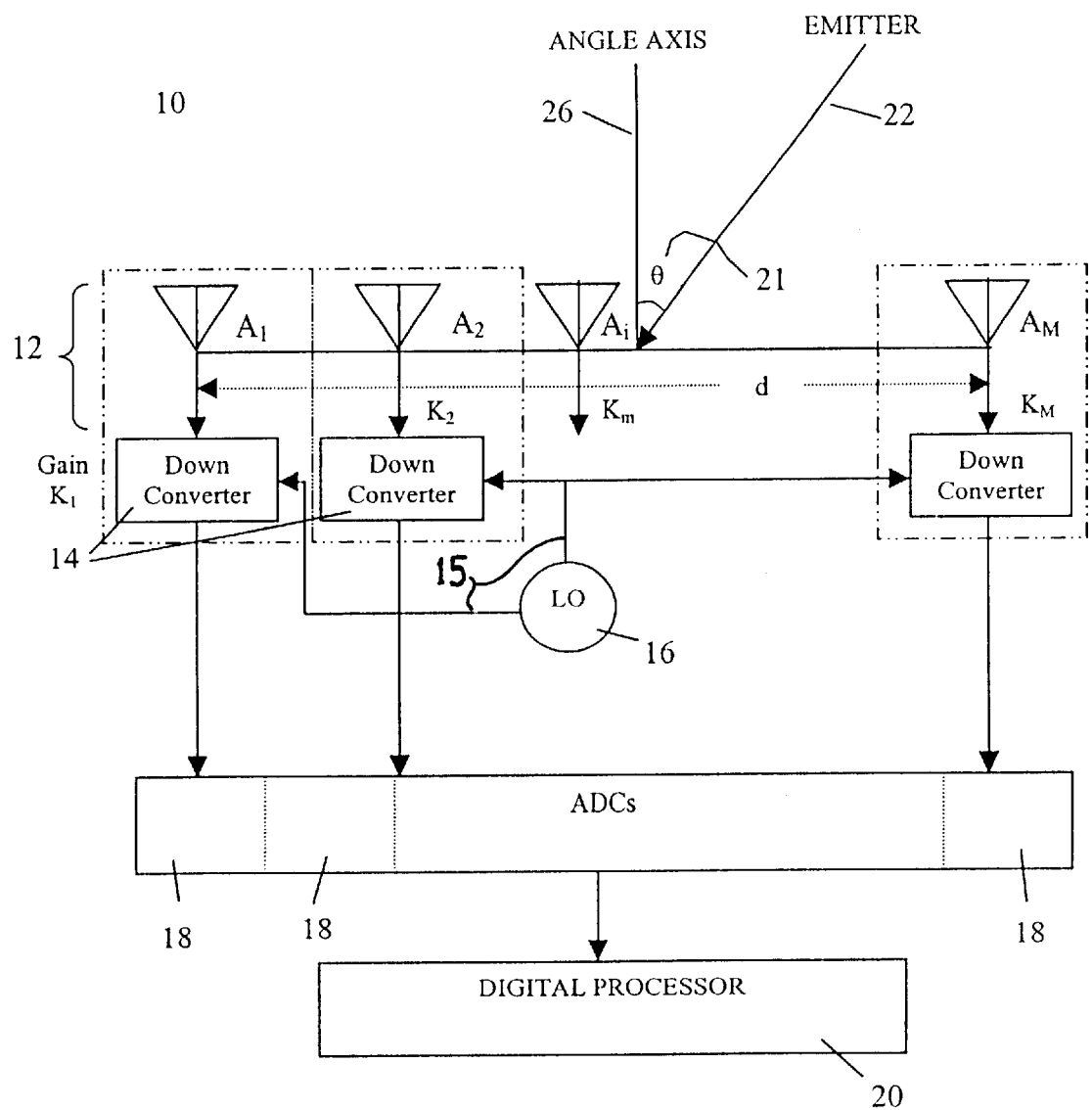
FIG. 1 is a block diagram of a multi-channel digital receiver architecture according to an embodiment of the present invention.

For convenience in the following description, like numerals refer to like structures in the drawings.

Referring to FIG. 1, a multi-channel receiver architecture according to a general embodiment of the invention is shown by numeral 10. The receiver architecture consists of M channels, each channel comprised of an antenna 12 for receiving an incoming radar signal 22; one of M down converters 14, a local oscillator (LO) 16 signal 15, and an analog-to-digital converter 18. The receiver architecture further includes a digital processor 20 for processing the digitized data from each of the M channels and for controlling the Analog-To-Digital Converters (ADC's) 18. Each antenna $A_i$ in the array corresponds to a channel i of the receiver architecture and is comprised of a respective down converter $MIX_i$, which are driven by the local oscillator signal 15 to convert and amplify by $K_i$ the intercepted signal 22 from its respective antenna $A_i$ to an intermediate frequency $IF_i$. Each $IF_i$ is fed to a respective ADC 18, which converts the IF signal to a digital signal which is in turn applied to the digital processing system 20 for determining the relevant parameters from all the channels.

The operation of the receiver architecture may be explained as follows, if the radar signal intercepted by the antenna array 12 is of the form:

$$S_{RF}(t)=a(t)\cos[2\pi f_{RF}t+\phi(t)] \quad (1)$$

where a(t) is the amplitude, $f_{RF}$ is the carrier radio frequency (RF) and $\phi(t)$ is the phase function of the received signal.

Furthermore if it is assumed that the antenna elements are spaced so that the angle-of-arrival θ21 relative to a predetermined axis 26 of the array can be determined by comparing the phase differences between the signals received at the antenna elements $A_i$. The signal in each channel i is then amplified Ki before being mixed down with the local oscillator signal 15 to the intermediate frequency (IF) signal. The frequency of the LO 16 is chosen to be lower than that of the RF signal of interest.

Each down converter 14 is typically comprised of an RF pre-amplifier followed by a preselector, a mixer and an IF filter and amplifiers (not shown), all of which are well known in the art. The input noise contribution of each receiver channel is usually dominated by its RF pre-amplifier noise since subsequent stages in the receiver channel are preceded by sufficient gain in order to overcome the additional noise introduced by these subsequent stages.

The IF signal is passed through the ADC (18) and the signal information is preserved in terms of both amplitude and phase. Using this information, all three of the required receiver functions (i.e. (a) measuring and characterizing conventional pulsed radar signals; (b) detecting and characterizing LPI signals; and (c) determining the AOA for both conventional pulsed signals and LPI signals) can be performed by the digital processor 20 in either hardware or software. Furthermore, adaptive signal processing can also be used in the combining and extraction of parameters from all channels. Each of these blocks will be described in detail below.

Figure 2:
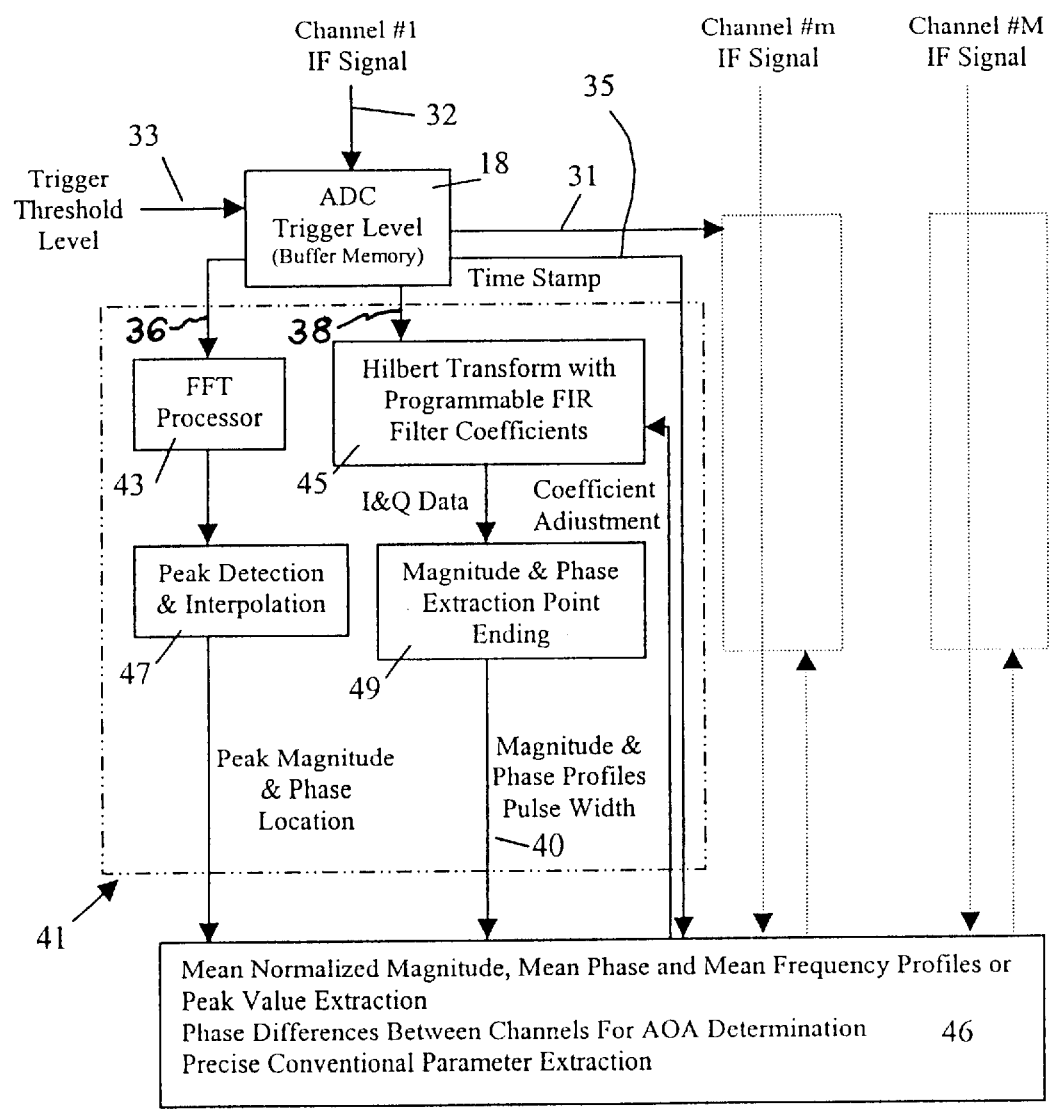
FIG. 2 is a block diagram of the signal processor for each of the channels.

Referring now to FIG. 2, the processing system 20 for processing of the IF signals is shown in greater detail. For illustrative purposes, the following description makes reference to channel #1 but it is assumed each of the M receiver channels has the same functional blocks. The IF signal 32 in channel #1 is applied to the channel #1 ADC 18. The ADC's for each channel are synchronized in time and are set to have the same sampling rates. This synchronization and control may be provided by the processing system, signal 31.

One of the channels is used as a reference channel (assume channel #1 as shown) where a trigger threshold level 33 is applied. Once the incoming signal exceeds the threshold level, a time stamp marker 35 is generated by the respective channel ADC 18 to mark the beginning of the digitized data from all channels. This signal is provided to processing system 20. The trigger threshold level and the length of the data set can be preset or programmed by the processing system 20.

The processing system 20 comprises for each of the channels a channel processing block 41. The channel processing block 41 is comprised of a FFT processor 43; a Hilbert transformer 45 with programmable FIR filter coefficients for producing I and Q components of the input data; a peak detection and interpolation module 47 for producing a peak magnitude and phase location signals; and a magnitude and phase extraction module 49 for producing magnitude, phase profiles and pulse width. The outputs from each of the channel processing blocks 41 are coupled to a common computation block 46 for computing mean normalized magnitude; mean phase; mean frequency profiles or peak value extraction; phase differences between channels for AOA determination and precise conventional parameter extraction.

The operation of the processing block 41 shown in FIG. 2 may be described as follows. After being converted into a digital format, the IF signal is split into two streams 36 and 38 respectively, one to be analyzed in the time domain and one to be analyzed in the frequency domain. The frequency domain information 36 is coupled to the Fast Fourier Transform (FFT) processor 43 and the time domain information 38 is coupled to the programmable Hilbert transformer 45 which is used to generate both the in-phase and quadrature (I&Q) components of the signal 32. In the frequency domain analysis, if the signal is of biphase coding (i.e., +−polarity) it is squared before being processed by the FFT processor 43. The peak detection module 47 is then used to locate and identify the centroid of each signal in the data set from the FFT processor 43. Interpolation of the frequency data sets is needed to accurately compute the carrier frequency of the signal. If the signal is of biphase coding, the carrier frequency is determined with the understanding that resultant frequency will be twice the original IF frequency due to the previous squaring operation. Thus, the peak magnitude, carrier frequency, and phase of the signal are determined for each receiver channel.

Since commercial ADCs and ADCs used in multi-channel digital oscilloscopes with an eight-bit resolution sampling at a 1-GHz rate are now readily available, a 400-MHz instantaneous bandwidth can be achieved with the multi-channel digital receiver architecture. This bandwidth is expected to increase in the near future. In the FFT operation 43, the frequency resolution is inversely proportional to the duration of the signal for pulsed modulated continuous-wave (CW) signals. If the pulse width is 5 μs, then the 3-dB bandwidth of the signal and its noise equivalent bandwidth is approximately 200 KHz. When compared to the input receiver noise bandwidth of 400 MHz, an improvement factor of 2,000 (or 33 dB) is obtained. The improvement factor will be somewhat degraded for a signal with intentional intrapulse modulation such as phase or frequency modulation. The improvement in sensitivity will greatly enhance the receiver's capability for LPI signal detection. Once the carrier frequency of the signal is determined, it can be used to program the Finite Impulse Response (FIR) filters 45 in the time domain chain 38.

The second stream of data is analyzed in the time domain. The data is first passed though the "programmable" Hilbert transformer 45 which is used to generate both the in-phase and quadrature (I&Q) components of the signal. The I&Q components are used to determine the amplitude and phase profiles of the signal as a function of time 40. The purpose of using the "programmable" Hilbert transform is to provide flexibility in changing the filter passband centre frequency and bandwidth for allowing signals of interest to pass through while rejecting signals outside the passband. The filtering will also improve the output SNR and the intrapulse parameters of the signal. The parameters for programming can be obtained from the frequency domain analysis as mentioned above, other receiving systems, or a priori knowledge. In the case where the parameters are coming from the frequency domain analysis, the digital input to the Hilbert transformer 45 must be delayed through a memory buffer in the ADC 18. Finally, since the vast majority of signals are finite in duration, an end-pointing procedure (49) is needed to determine the precise time-of-arrival (TOA) for PRI and pulse width parameters determination.

Once the digital data from the ADC 18 has been processed in both the time and frequency domains by the processing block 41, the following profiles and parameters are available: Magnitude and phase profiles; TOA and pulse width (PW); Carrier Frequency; Peak Magnitude and its phase. These parameters can then be used to extract all the precision conventional parameters and intrapulse data of each signal.

In addition, since this is a multi-channel digital architecture, both the time and phase parameters from all of the channels can first be combined before the extraction of the conventional parameters and intrapulse data. The combination process is simple if the demodulated amplitude and phase profiles are used. The precision and intrapulse parameters that are extracted by using the combined data from all the channels can be significantly better than simply using the data from only one channel. An example of how the combined data will lead to improved results is given below.

By taking N samples of the digitized IF signal from each channel the amplitude and phase of the radar signal can be computed. For a Guassian noise distribution, the standard deviation of the phase for each data sample is given by $$\sigma_{\phi,m} = 1/\sqrt{2SNR_m} \qquad (2)$$

where $SNR_m$ is given by $$SNR_m = K_m^2 a^2(t)/(2\sigma_{z,m}^2) \qquad (3)$$

and $\sigma_{z,m}$ and $K_m$ are the standard deviation of the noise and gain in the mth channel respectively. For a large SNR, the probability density functions of both the amplitude and the phase are approximately Guassian. If the noise from the receiver is dominant by the noise from the pre-amplifier and the receiver channels are matched, then the SNR in each channel is approximately the same and is given by $$SNR_m \approx SNR = a^2(t)/2\sigma^2 \qquad (4)$$

where $$\sigma = \sqrt{\eta b_{IF}} \qquad (5)$$

$B_{IF}$ is the bandwidth of the IF bandpass filter in the downconverter 14 and η is the power spectral density. Using the above expression for $SNR_m$, the standard deviation for the amplitude $\sigma_{a,m}$ normalized with respect to the amplitude $a_m(t)$ is given in dB by $$[\sigma_{a,m}/a_m(t)] \text{ (dB)} = 20\log_{10}\left[1/\sqrt{2SNR_m}\right] \qquad (6)$$

Since most noise between channels of a multi-channel receiver is uncorrelated, then for large SNR, the phases derived are Gaussian and independent. Hence, if the phases from all M channels are summed and a mean taken, the standard deviation of the combined phase can be shown to be $$\sigma_\phi = \frac{1}{M}\sqrt{\sum_{m=1}^{M} \frac{1}{2SNR_m}} \qquad (7)$$

Similarly, the combined ratio for the normalized amplitude error is also given by Equation (7), and when expressed in decibels, we have $$\left[\frac{\sigma_a}{a(t)}\right]_c \text{ (dB)} = 20\log_{10}\left[\frac{1}{M}\sqrt{\sum_{m=1}^{M} \frac{1}{2SNR_m}}\right] \qquad (8)$$

If the phase φ(t) is estimated using N data samples, then the Cramer-Rao lower bound on the estimator accuracy is given by $$\sigma_\phi = \frac{1}{M}\sqrt{\sum_{m=1}^{M}\frac{1}{2SNR_m N}} \qquad (9)$$

Similarly, the Cramer-Rao lower bound for estimating the IF frequency of the signal with a sampling interval T is $$\sigma_{f_{IF}} = \frac{1}{2\pi MT}\sqrt{\sum_{m=1}^{M}\frac{6}{SNR_m N(N^2-1)}} \qquad (10)$$

As can be seen from equations (7) to (10), the accuracy of the estimation of the amplitude, phase and frequency can be improved by averaging the profiles from all the channels. This improvement is directly in proportional to the square root of the number of channels processed assuming that the gain and noise distribution for all M channels are identical.

The AOA is derived by comparing the phase values from all of the channels. The phase value can either be the mean phase or the phase where the peak magnitude occurs in either the frequency or time domain. For DF using an inferometer, the angular accuracy is determined by comparing the phase difference between the outermost antenna elements while the innermost antennas are used to resolve phase ambiguity. In general, AOA accuracy is a function of a number of factors such as phase tracking errors between channels and propagation effects. Making use of equation 4, the Cramer-Rao lower bound for angular accuracy when all N points are used and when noise is the only source of error is $$\sigma_{\theta_{M,1}} \approx \frac{\lambda}{2\pi d|\cos(\phi)|\sqrt{\frac{1}{SNRN}}} \qquad (11)$$

where $\sigma_{74}$ is the standard deviation of the AOA in radians, d is the length of the array baseline, θ is the AOA, and λ is the wavelength of the received radar signal.

The intrapulse and AOA parameters are interrelated and may be subjected to perturbations such as multipath effects. However, since the multi-channel digital architecture provides simultaneous intrapulse and AOA measurements on each data point of the radar signal, the quality of one parameter may be used to verify the validity of the other. For example, it is difficult to discern the multipath effects on the received signal simply by observing the intrapulse profile. The magnitude of the change on the profile due to multipath effects depends on the time delay between the direct and indirect path, the signal intrapulse characteristics, its frequency, and the relative magnitude and phase of the two signals. However, the additional AOA information can be used to differentiate and verify multipath effects. Similarly, if the changes in the intrapulse profile are abrupt enough to be noticed, then the measured AOA may not be valid in the region where the direct and delayed signals overlap. Therefore, the capability of performing both functions at once prevent the use of invalid data and help to verify correct data.

The processing functions involved can be quite complex and numerous once the IF signal has been digitized. Although digital signal technology has advanced to the point that an architecture such as the one described here is possible, it is still not advanced enough to meet all of the necessary requirements if all the processing is to be performed in real-time. However, if the receiver is to be used only for the detection and direction-finding of LPI signals, ignoring conventional signals, then in this case, an additional circuitry is required. The added circuit must be able to suppress the conventional signals while enabling the LPI signals to be processed by the receiver as previously detailed. Eventually, when the digital processing technology becomes fast enough, this circuit will not be required (as disclosed in the Applicant's pending application filed concurrently herewith).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A receiver for determining parameters of an incoming signal, comprising:
   (a) a plurality of receiver channels, each channel including a respective antenna for receiving said incoming signal;
   (b) a down converter for converting said signal to an intermediate frequency (IF) signal;
   (c) an analog-to-digital converter operatively coupled to receive said IF signal and to provide a digital signal at a predetermined sampling rate, said digital signal being indicative of the phase and amplitude of said received signal in said channel; and
   (d) a digital processor operatively coupled to receiving said digital signals from each of said plurality of channels and for determining said parameters by utilizing said phase and amplitude on a pulse-by-pulse basis.

2. A receiver as defined in claim 1, said parameters including simultaneous intrapulse analysis, direction finding and LPI signal detection.

3. A receiver as defined in claim 1, said digital processor including means for determining the frequency profile of said incoming signal.

4. A receiver as defined in claim 1, each said channel including a FFT processor operatively coupled to said analog-to-digital converter to provide frequency components of said digital signal.

5. A receiver as defined in claim 1, each said channel including a Hilbert transformation network operatively coupled to said analog-to-digital converter to provide a quadrature component of the digital signal.

6. A receiver as defined in claim 5, said Hilbert transformation providing in-phase components of the digital signal.

7. A receiver as defined in claim 6, said Hilbert transformer including a programmable FIR filter coefficients.

8. A method for determining parameters of an incoming signal, comprising the steps of:
   (a) receiving said incoming signal in a plurality of receiver channels;
   (b) converting said signal to an intermediate frequency (IF) signal;
   (c) converting said IF signal in each channel to a digital signal at a predetermined sampling rate, said digital signal being indicative of the phase and amplitude of said received signal in said channel; and
   (d) processing said digital signals from each of said plurality of channels to determine said parameters by utilizing said phase and amplitude on a pulse-by-pulse basis.

9. A multi-function, multi-channel digital receiver architecture for performing the three distinct receiver functions including simultaneous intrapulse analysis, direction finding and LPI signal detection, on the measurement of parameters including intrapulse, precision conventional and angle-of-arrival (AOA) parameters of an incoming signal, comprising:

(a) a plurality of receiver channels, each channel including a respective antenna for receiving the signal;

(b) a down-converter for converting the signal to an intermediate frequency (IF) signal;

(c) an analog-to-digital converter operatively coupled to receive the IF signal and to provide a digital signal at a sampling rate, the digital signal being indicative of the amplitude and phase of the received signal in the channel, and (d) a digital processor operatively coupled to receiving the digital signals from each of the plurality of channels and for determining the parameters by utilizing the amplitude and phase on a pulse-by-pulse basis; by combining the amplitude and phase intrapulse profiles from all of the plurality of channels to provide parameters of a better quality and utilizing both the AOA and intrapulse information for parameter validation under multipath conditions.

10. A multifunction, multi-channel digital receiver architecture as defined in claim 9, said receiver functions including simultaneous intrapulse analysis, direction finding and LPI signal detection.

11. A receiver architecture as defined in claim 9, said digital processor including means for determining the amplitude and phase intrapulse profiles of said incoming signal.

12. A receiver architecture as defined in claim 9, said digital processor including means for determining the combined amplitude and phase intrapulse profiles by taking the mean of said profiles.

13. A receiver architecture as defined in claim 9, said digital processor including means for determining parameters including the combined intrapulse, precision conventional and angle-of-arrival (AOA) parameters of said incoming signal.

14. A receiver architecture as defined in claim 9, each said channel including a FFT processor operatively coupled to said analog-to-digital converter to provide frequency components of said digital signals.

15. A receiver architecture as defined in claim 9, each said channel including a Hilbert transformer operatively coupled to said analog-to-digital converter to provide an in-phase and quadrature time series components of the digital signals.

16. A receiver architecture as defined in claim 15, said Hilbert transformer including a FIR filter with programmable coefficients.

\* \* \* \* \*